United States Patent
Wang (10) Patent No.: US 8,606,273 B2
(45) Date of Patent: Dec. 10, 2013

(54) NETWORK SELECTION METHOD AND TERMINAL DEVICE

(75) Inventor: Jie Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 25 days.

(21) Appl. No.: 13/462,325

(22) Filed: May 2, 2012

(65) Prior Publication Data

US 2012/0220298 A1 Aug. 30, 2012

Related U.S. Application Data

(63) Continuation of application No. PCT/CN2010/078179, filed on Oct. 28, 2010.

(30) Foreign Application Priority Data

Nov. 3, 2009 (CN) .......................... 2009 1 0207415

(51) Int. Cl.
*H04Q 7/20* (2006.01)

(52) U.S. Cl.
USPC ................... 455/435.2; 455/404.2; 455/436; 455/440; 455/435.1

(58) Field of Classification Search
USPC ....................................................... 455/435.1
See application file for complete search history.

(56) References Cited

U.S. PATENT DOCUMENTS

| | | |
|---|---|---|
| 2003/0134637 A1 | 7/2003 | Cooper |
| 2004/0203775 A1 | 10/2004 | Bourdeaut et al. |
| 2006/0116125 A1 | 6/2006 | Buckley et al. |
| 2011/0028120 A1* | 2/2011 | Wu .......................... 455/404.1 |

FOREIGN PATENT DOCUMENTS

| | | |
|---|---|---|
| CN | 1640180 A | 7/2005 |
| CN | 1728876 A | 2/2006 |
| CN | 1832615 A | 9/2006 |
| CN | 1832618 A | 9/2006 |
| CN | 101699902 A | 4/2010 |
| EP | 1 962 540 A1 | 8/2008 |
| JP | 2008522460 A | 6/2008 |
| WO | WO 2004/040931 A2 | 5/2004 |
| WO | WO 2007/079579 A1 | 7/2007 |
| WO | WO 2007/091808 A1 | 8/2007 |

OTHER PUBLICATIONS

English language International Search Report from the State Intellectual Property Office of P.R. China for International Application No. PCT/CN2010/078179 mailed Feb. 3, 2011.

(Continued)

*Primary Examiner* — Charles Appiah
*Assistant Examiner* — Randy Peaches
(74) *Attorney, Agent, or Firm* — Conley Rose, P.C.; Grant Rodolph; Nicholas K. Beaulieu (57) ABSTRACT

A network selection method and a terminal device are provided. When a terminal performs location registration or location update, if access to a first network domain fails, a locally-configured domain priority setting item is obtained; if the domain priority setting item indicates that the first network domain is preferential, the terminal reselects a network; if the domain priority setting item indicates that a second network domain is preferential, the terminal judges whether registration in a second network is successful; if the registration is unsuccessful, the terminal reselects a network; if the registration is successful, the terminal does not reselect a network.

14 Claims, 4 Drawing Sheets

(56) References Cited

OTHER PUBLICATIONS

Foreign Communication from a Counter-Part Application, European Application EP 10827882.1, Extended European Search Report dated Aug. 30, 2012, 8 pages.
Alu, "SMS Over LTE: Coexistence of CSFB with SMoIP for SMS, and CSFB Optimized Solution for Data Cards," 3GPP Draft: S2-094475 SMS Over LTE v2, 3rd Generation Partnership Project (3GPP), Mobile Competence Center; Jun. 30 2009, 3 pages.
Foreign Communication from a Counter-Part Application, PCT Application PCT/CN2010/078179, English Translation Written Opinion dated Feb. 3, 2011, 4 pages.
Foreign Communication From A Counterpart Application, Japanese Application No. 2012-537289, Japanese Office Action dated Jul. 9, 2013, 2 pages.
Foreign Communication From A Counterpart Application, Japanese Application No. 2012-537289, English Translation of Japanese Office Action dated Jul. 9, 2013, 2 pages.
"Avoiding Ping-Pong for CS/PS Mode 1 UE in Connected Mode," Qualcomm Europe, R2-093171, 3GPP TSG-RAN WG2 Meeting #66, San Francisco, May 4-8, 2009, 3 pages.
"Response LS on CS Domain and IM CN Subsystem Selection Principles," R2-092804, 3GPP TSG-RAN WG2 Meeting #66, San Francisco, May 4-8, 2009, C1-092263, 3GPP TSG-CT WG1 Meeting #58, Sophia Antipolis, Apr. 20-24, 2009, 5 pages.
"CS Domain and IM CN Subsystem Selection Principles," Change Request, S2-094178, 3GPP TSG-SA WG2 Meeting #73, Tallinn, Estonia, May 11-15, 2009.

\* cited by examiner

NETWORK SELECTION METHOD AND TERMINAL DEVICE

CROSS-REFERENCE TO RELATED APPLICATIONS

This application is a continuation of International Application No. PCT/CN2010/078179, filed on Oct. 28, 2010, which claims priority to Chinese Patent Application No. 200910207415.5, filed on Nov. 3, 2009, both of which are hereby incorporated by reference in their entireties.

FIELD OF THE INVENTION

The present invention relates to the communications field, and in particular, to a network selection method and a terminal device.

BACKGROUND OF THE INVENTION

After a startup or during a location update, a mobile terminal needs to perform a network search. A network search capability of the terminal may be considered as an important index for evaluating terminal quality. Taking a Wideband Code Division Multiple Access (Wideband Code Division Multiple Access, WCDMA) system as an example, a network search process of the terminal may be divided into two subprocesses, namely Public Land Mobile Network (Public Land Mobile Network, PLMN) selection and cell search.

A PLMN is jointly identified by a Mobile Country Code (Mobile Country Code, MCC, 3 numbers) and a Mobile Network Code (Mobile Network Code, MNC, 2 or 3 numbers). Each country has one or more PLMNs. Taking China as an example, a network code of a Global System for Mobile Communications (Global System for Mobile Communications, GSM) network of China Mobile Communications Corporation is represented by using "00"; and a network code of a GMS network of China Unicom Corporation is represented by using "01". The PLMN is formed by multiple cells, and a cell is a minimum coverage unit in a mobile communication network.

Both the GSM and the WCDMA are divided into a Circuit Switching (Circuit Switching, CS) domain and a Packet Switching (Packet Switching, PS) domain. At present, most terminals support the CS and the PS at the same time, namely support a voice service and a GPRS data service at the same time. After the terminal is started or offline, the terminal performs the network search, first selects a PLMN and then searches for a cell that belongs to the PLMN. After finding the cell meeting conditions, the terminal obtains information of adjacent cells from a system broadcast message; according to the information, the terminal selects and stays resident in a cell with the best signal among these cells and performs location registration. A location registration process is initiated in both the CS domain and the PS domain. At present, both the GSM and the WCDMA require that the CS domain and PS domain of the terminal registration must belong to a same network.

When the terminal performs location registration or location update, after a location registration or location update request is initiated, if the CS domain rejects terminal access, the terminal performs network reselection. If the PS domain rejects the access, while the location registration or location update in the CS domain already succeeds, the terminal does not perform PLMN reselection, and stays resident in the network.

A basic principle of the foregoing existing network selection manner of the terminal is that, for the terminal supporting the CS and the PS at the same time, when the location registration or location update in the CS domain is rejected by the network, the terminal reselects a network; when the location registration or location update in the PS domain is rejected by the network, the terminal does not reselect a network, which cause a user to be incapable of performing a packet switching service, thus seriously affecting user experience as the packet switching service is being developed increasingly nowadays. For example, for a data card user, although a data card supports the CS and PS at the same time, the user hardly uses a voice CS service. Therefore, the data card user generally expects that the PS data service is ensured more reliably.

SUMMARY OF THE INVENTION

Embodiments of the present invention provide a network selection method and a terminal device, which may ensure connection reliability of a network domain that a user preferentially uses.

An embodiment of the present invention provides a network selection method of a wireless terminal, where the method includes: when a terminal performs location registration or location update, if access to a first network domain fails, obtaining a locally-configured domain priority setting item; if the domain priority setting item indicates that the first network domain is preferential, reselecting, by the terminal, a network; if the domain priority setting item indicates that a second network domain is preferential, judging, by the terminal, whether registration in a second network is successful; if the registration is unsuccessful, reselecting, by the terminal, a network; if the registration is successful, not reselecting, by the terminal, a network.

An embodiment of the present invention provides a terminal device, including: a first unit, configured to obtain a locally-configured domain priority setting item when a terminal fails to access a first network domain; a second unit, configured to reselect a network when the domain priority setting item obtained by the first unit indicates that the first network domain is preferential, and further judge whether registration in a second network is successful when the domain priority setting item obtained by the first unit indicates that a second network domain is preferential; if the registration is unsuccessful, the terminal reselects a network; if the registration is successful, the terminal does not reselect a network.

In the embodiments of the present invention, when the terminal performs the location registration or location update, if the access to the first network domain fails, the locally-configured domain priority setting item is obtained; if the domain priority setting item indicates that the first network domain is preferential, the terminal reselects a network; if the domain priority setting item indicates that the second network domain is preferential, the terminal judges whether the registration in the second network is successful; if the registration is unsuccessful, the terminal reselects a network; if the registration is successful, the terminal does not reselect a network. By adding a domain priority setting item in the terminal, when access to the network fails, the terminal judges, according to the domain priority setting item, whether it is needed to reselect a network, which ensures the connection reliability of the network domain that the user preferentially uses. Therefore, manufacturers may implement different network selection manners through configuration of the domain priority setting item for different types of terminals, which is more adaptive to user demands.

BRIEF DESCRIPTION OF THE DRAWINGS

Accompanying drawings described here are provided for further understanding of the present invention, which are merely part of the application, and are not intended to limit the present invention. In the accompanying drawings.

DETAILED DESCRIPTION OF THE EMBODIMENTS

In order to make the objectives, technical solutions and advantages of the present invention clearer, the present invention is further described in detail with reference to the accompanying drawings and embodiments. The exemplary embodiments and descriptions of the exemplary embodiments of the present invention here are used to illustrate the present invention, and are not intended to limit the present invention.

Embodiment 1

Figure 1:
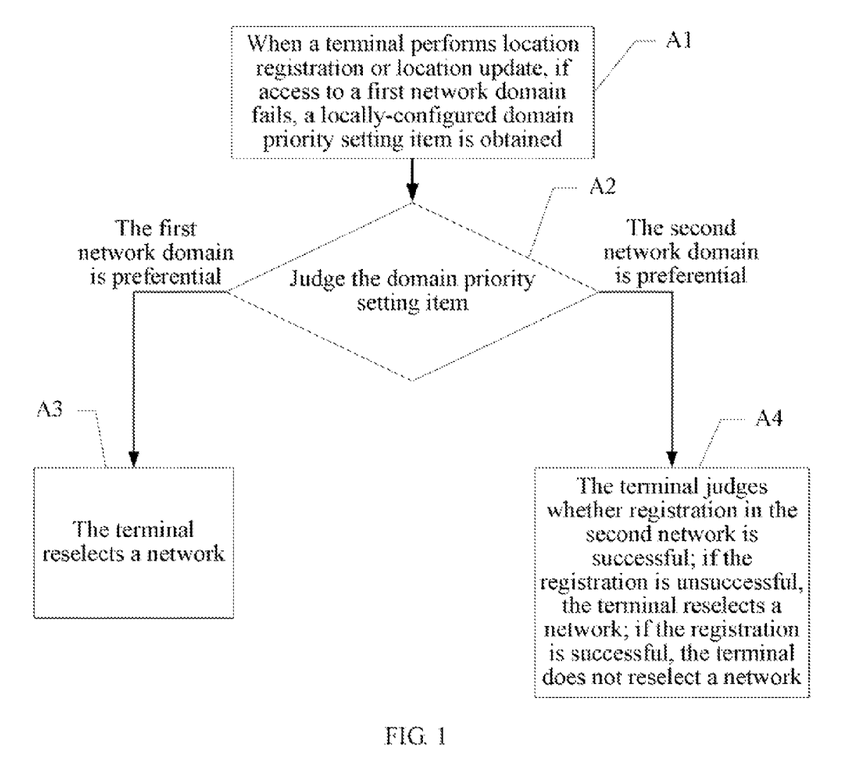
FIG. 1 is a flow chart of a network selection method according to a first embodiment of the present invention.

A network selection method of a wireless terminal, a flow chart of which is as shown in FIG. 1, includes:

A1: When a terminal performs location registration or location update, if access to a first network domain fails, a locally-configured domain priority setting item is obtained.

In some embodiments of the present invention, a first network and a second network do not have a sequential relationship, and are merely used to distinguish different network forms. Generally, the first network domain is a Circuit Switching (CS) domain, and the second network domain is a Packet Switching (PS) domain; alternatively, the first network domain is a PS domain and the second network domain is a CS domain. Generally, for a data card user, it may be set in the domain priority setting item that the PS domain is preferential, while for an ordinary mobile phone user, it may be set in the domain priority setting item that the CS domain is preferential.

A specific location registration process of the terminal includes: sending a location registration request, which may be that the terminal initiates a CS domain location registration request message and/or a PS domain location registration request message to a network, or the terminal initiates a CS domain and PS domain combined location registration request message to the network.

A location update process of the terminal may include: the terminal initiates a CS domain location update request message and/or a PS domain location update request message to the network, or the terminal initiates a CS domain and PS domain combined location update request message to the network.

A network registration process of the terminal is taken as an example for illustration below.

(1) When the terminal is started or offline, the terminal performs a network search, and initiates a location registration process after selecting an appropriate cell. The terminal initiates a CS location registration request message and/or a PS location registration request message, or a CS/PS combined location registration request message to the network. (A PS location registration process may not be initiated when the terminal is started, and be initiated when a user has a data service request subsequently, and in this case, the terminal only initiates a CS location registration process.)

(2) The terminal receives a CS location registration response message or/and a PS location registration response message that are returned by the network. If the network rejects a CS location registration request, a cause value may include, but is not limited to, "PMLN not allowed (PMLN not allowed)", "Roaming not allowed in this location area (Roaming not allowed in this location area)", "Location area not allowed (Location area not allowed)", and "IMSI unknown in HLR (IMSI unknown in HLR)". If the network rejects a PS location registration request, a cause value may be, but is not limited to, "GPRS services not allowed in this PLMN (GPRS services not allowed in this PLMN)".

It can be understood that, in the embodiment of the present invention, the domain priority setting item is pre-stored in the terminal. This parameter may be set by an operator or a terminal manufacturer, or set by a terminal user through a setting interface.

A2: Judge the domain priority setting item; if the domain priority setting item indicates that the first network domain is preferential, the process proceeds to step A3; if the domain priority setting item indicates that the second network domain is preferential, the process proceeds to step A4.

A3: The terminal reselects a network.

A4: The terminal judges whether registration in the second network is successful; if the registration is unsuccessful, the terminal reselects a network; if the registration is successful, the terminal does not reselect a network.

It can be understood that, in the embodiment, before the terminal reselects a network, the method further includes: the terminal further judges whether a service is being performed; if a service is being performed, the terminal reselects a network after the service is finished. The service is a PS domain service and/or a CS domain service.

In the first embodiment of the present invention, when the terminal performs the location registration or location update, if the access to the first network domain fails, the locally-configured domain priority setting item is obtained; if the domain priority setting item indicates that the first network domain is preferential, the terminal reselects a network; if the domain priority setting item indicates that the second network domain is preferential, the terminal judges whether the registration in the second network is successful; if the registration is unsuccessful, the terminal reselects a network; if the registration is successful, the terminal does not reselect a network. By adding a domain priority setting item in the terminal, when access to the network fails, the terminal judges, according to the domain priority setting item, whether it is needed to reselect a network, which ensures connection reliability of the network domain that a user preferentially uses. Therefore, manufacturers may implement different network selection manners through configuration of the domain priority setting item for different types of terminals, which is more adaptive to user demands.

Embodiment 2

Figure 2:
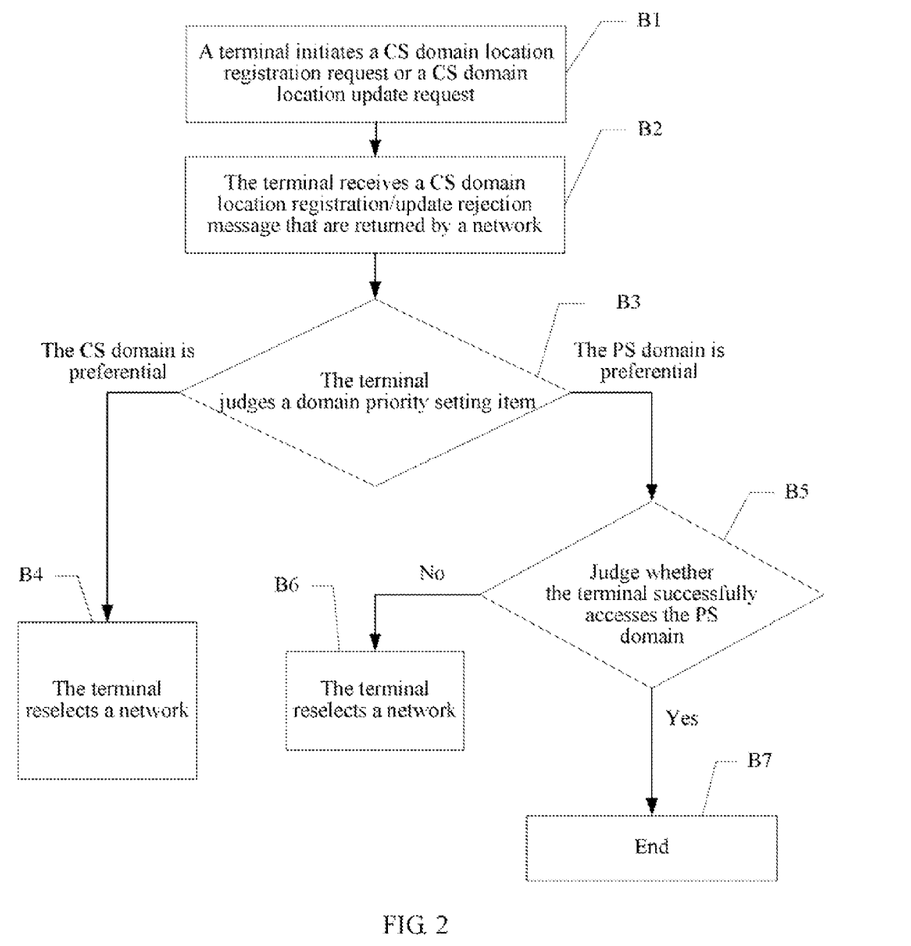
FIG. 2 is a flow chart of a network selection method according to a second embodiment of the present invention.

A network selection method of a wireless terminal, a flow chart of which is as shown in FIG. 2, includes:

B1: A terminal initiates a CS domain location registration request or a CS domain location update request.

B2: The terminal receives a CS domain location registration/update rejection message which is returned by a network and carries a cause value.

B3: The terminal judges a domain priority setting item; if the domain priority setting item indicates that a CS domain is preferential, the process proceeds to step B4; if the domain priority setting item indicates that a PS domain is preferential, the process proceeds to step B5.

B4: The terminal reselects a network, and the process ends.

B5: Judge whether the terminal successfully accesses the PS domain; if the terminal does not successfully access the PS domain, the process proceeds to step B6; if the terminal successfully accesses the PS domain, the process proceeds to step B7.

B6: The terminal reselects a network, and the process ends.

B7: The terminal does not reselect a network, and the process ends.

In the second embodiment of the present invention, by adding a domain priority setting item in the terminal, when access to the CS domain fails, the terminal judges, according to information of the domain priority setting item, whether it is needed to reselect a network, which ensures connection reliability of the network domain that a user preferentially uses. Therefore, manufacturers may implement different network selection manners through configuration of the domain priority setting item for different types of terminals, which is more adaptive to user demands.

Embodiment 3

Figure 3:
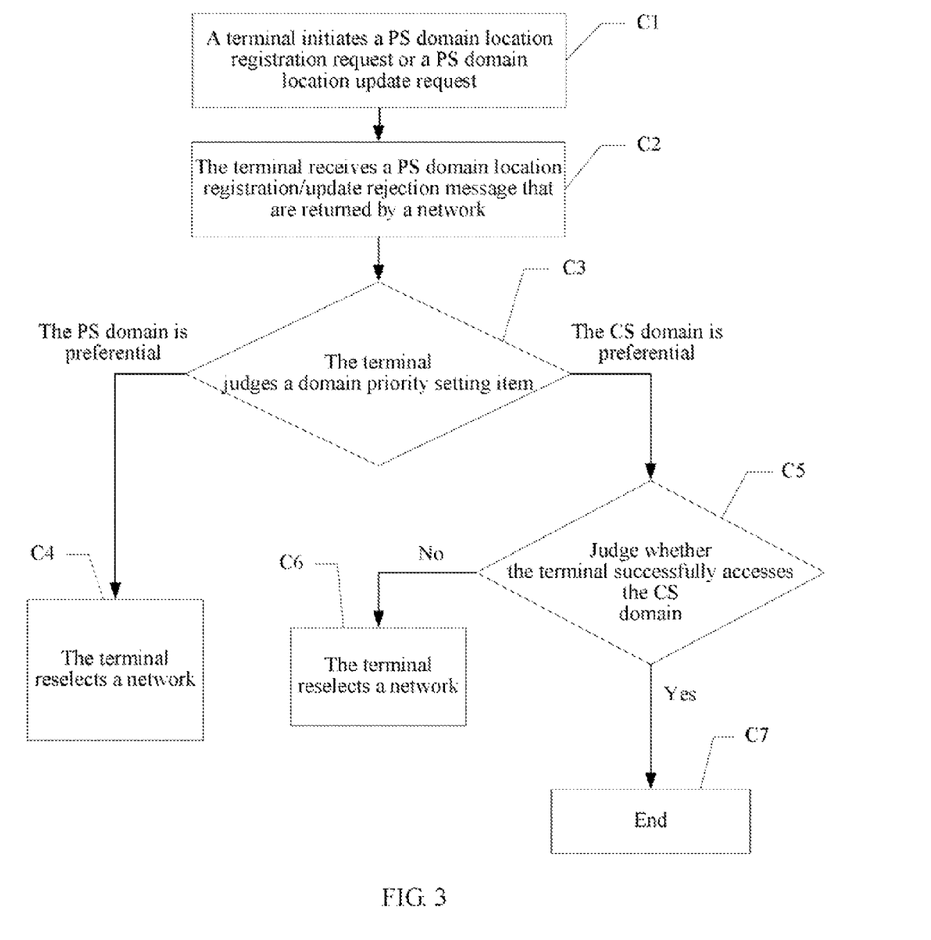
FIG. 3 is a flow chart of a network selection method according to a third embodiment of the present invention.

A network selection method of a wireless terminal, a flow chart of which is as shown in FIG. 3, includes:

C1: A terminal initiates a PS location registration request or a PS location update request.

C2: The terminal receives a PS location registration/update rejection message which is returned by a network and carries a cause value.

C3: The terminal judges a domain priority setting item; if the domain priority setting item indicates that a PS domain is preferential, the process proceeds to step C4; if the domain priority setting item indicates that a CS domain is preferential, the process proceeds to step C5.

C4: The terminal reselects a network, and the process ends.

C5: Judge whether the terminal successfully accesses the CS domain; if the terminal does not successfully access the CS domain, the process proceeds to step C6; if the terminal successfully accesses the CS domain, the process proceeds to step C7.

C6: The terminal reselects a network, and the process ends.

A network reselection process of the terminal includes a PLMN selection sub-process and a cell selection sub-process, for example, detecting signal strength of a PLMN network and selecting, according to a PLMN priority list stored by the terminal, a PLMN network with a high priority and an appropriate cell, and staying resident in the cell. Specific network selection manners may be slightly different in different network architectures, and references may be made to regular implementation manners in the prior art, which is not intended to limit the present invention.

C7: The terminal does not reselect a network, and the process ends.

In the third embodiment of the present invention, by adding a domain priority setting item in the terminal, when access to the PS domain fails, the terminal judges, according to information of the domain priority setting item, whether it is needed to reselect a network, which ensures connection reliability of the network domain that a user preferentially uses.

Therefore, manufacturers may implement different network selection manners through configuration of the domain priority setting item for different types of terminals, which is more adaptive to user demands.

A terminal device provided in the present invention is described in detail in the following description. For the convenience of illustration, only parts related to the embodiment of the present invention are shown. The terminal device may be a mobile phone, a data card, or a similar terminal, and functional modules/units included in the terminal device may be hardware modules/units, software modules/units or software and hardware combined modules/units.

Embodiment 4

Figure 4:
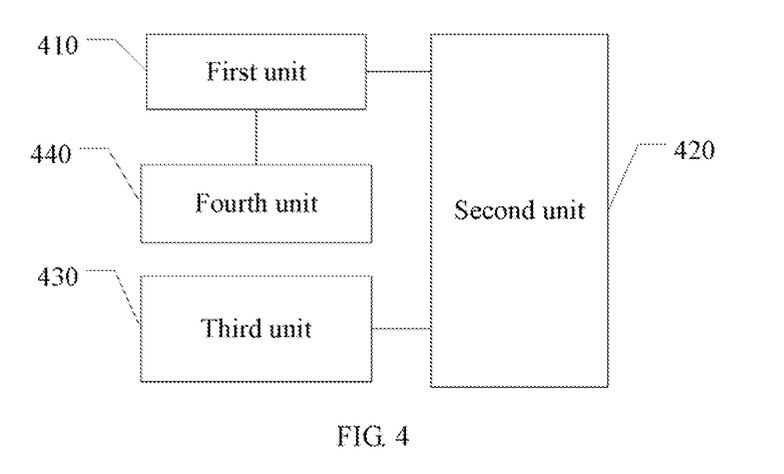
FIG. 4 is a schematic structural diagram of a terminal device according to a fourth embodiment of the present invention.

A terminal device, a schematic structural diagram of which is as shown in FIG. 4, includes:

A first unit 410 is configured to obtain a locally-configured domain priority setting item when a terminal fails to access a first network domain.

A second unit 420 is configured to reselect a network when the domain priority setting item obtained by the first unit 410 indicates that the first network domain is preferential, and further judge whether registration in a second network is successful when the domain priority setting item obtained by the first unit 410 indicates that a second network domain is preferential, where if the registration is unsuccessful, the terminal reselects a network; if the registration is successful, the terminal does not reselect a network.

It can be understood that the terminal device in the embodiment further includes:

A third unit 430 is configured to further judge whether a service is being performed before the second unit 420 reselects a network, monitor performing of the service if the service is being performed, and instruct the second unit to reselect a network after the service is finished.

It can be understood that the terminal device in the embodiment further includes:

A fourth unit 440 is configured to perform location registration and location update, where the location registration includes: initiating a CS domain location registration request message and/or a PS domain location registration request message to a network, or initiating a CS domain and PS domain combined location registration request message to the network. The location update includes: initiating a CS domain location update request message and/or a PS domain location update request message to the network, or initiating a CS domain and PS domain combined location update request message to the network.

In the embodiment, the first network domain is a Circuit Switching (CS) domain, and the second network domain is a Packet Switching (PS) domain; alternatively, the first network domain is a PS domain, and the second network domain is a CS domain.

In the terminal device provided in the fourth embodiment of the present invention, when the location registration or location update is performed, if the access to the first network domain fails, the locally-configured domain priority setting item is obtained; if the domain priority setting item indicates that the first network domain is preferential, the terminal reselects a network; if the domain priority setting item indicates that the second network domain is preferential, the terminal judges whether the registration in a second network is successful; if the registration is unsuccessful, the terminal reselects a network; if the registration is successful, the terminal does not reselect a network. By adding a domain priority setting item in the terminal, when access to the network fails, the terminal judges, according to the domain priority setting item, whether it is needed to reselect a network, which ensures connection reliability of the network domain that a user preferentially uses. Therefore, manufacturers may implement different network selection manners through configuration of the domain priority setting item for different types of terminals, which is more adaptive to user demands.

Persons of ordinary skill in the art may understand that all or part of the steps of the foregoing method embodiments may be implemented by a program instructing relevant hardware. The program may be stored in a computer readable storage medium. When the program is executed, the steps of the foregoing method embodiments are performed. The foregoing storage medium may be any medium that may be capable of storing program codes, such as a Read-Only Memory (Read-Only Memory, ROM), a Random Access Memory (Random Access Memory, RAM), a magnetic disk, or an optical disk.

For methods that the terminal device according to the fourth embodiment of the present invention may operate, references may be made to the foregoing descriptions of the method embodiments, and details are not repeatedly described here.

The network selection method and terminal device provided in the embodiments of the present invention are described in detail above.

In a method according to an embodiment of the present invention, when a terminal performs location registration or location update, if access to a first network domain fails, a locally-configured domain priority setting item is obtained; if the domain priority setting item indicates that the first network domain is preferential, the terminal reselects a network; if the domain priority setting item indicates that a second network domain is preferential, the terminal judges whether registration in a second network is successful; if the registration is unsuccessful, the terminal reselects a network; if the registration is successful, the terminal does not reselect a network. By adding a domain priority setting item in the terminal, when access to the network fails, the terminal judges, according to the domain priority setting item, whether it is needed to reselect a network, which ensures connection reliability of the network domain that a user preferentially uses. Therefore, manufacturers may implement different network selection manners through configuration of the domain priority setting item for different types of terminals, which is more adaptive to user demands.

Persons of ordinary skill in the art should understand that all or part of the steps of the methods according to the foregoing embodiments may be implemented by a program instructing relevant hardware. The program may be stored in a computer readable storage medium, and the storage medium may include a ROM, a RAM, a magnetic disk, or an optical disk.

The objectives, technical solutions, and beneficial effects of the present invention have been described in further detail through the foregoing specific embodiments. It should be understood that the foregoing descriptions are merely specific embodiments of the present invention, but not intended to limit the present invention. Any modification, equivalent replacement, or improvement made without departing from the spirit and principle of the present invention should fall within the protection scope of the present invention.

What is claimed is:

1. A network selection method of a terminal comprising:
    performing, by the terminal, a location registration or a location update to access a network domain;
    obtaining a locally-configured domain priority setting item based at least in part on a determination that access to a first network domain has failed, wherein the locally-configured domain priority setting item is pre-stored in the terminal and is configured to be set by an operator of the terminal;
    reselecting, by the terminal, a network domain based at least in part on the domain priority setting item indicating that the first network domain is preferential;
    judging, by the terminal, whether a registration in a second network domain is successful based at least in part on the domain priority setting item indicating that the second network domain is preferential; and
    reselecting, by the terminal, a network domain based at least in part on a judgment that the registration in the second network domain is unsuccessful.

2. The method according to claim 1, wherein the first network domain is a Circuit Switching (CS) domain, and wherein the second network domain is a Packet Switching (PS) domain.

3. The method according to claim 1, wherein performing the location registration comprises initiating, by the terminal, a CS domain location registration request message, a PS domain location registration request message, or a CS domain and PS domain combined location registration request message.

4. The method according to claim 1, further comprising:
    judging, by the terminal, whether a service is being performed before the terminal reselects the first network domain; and
    reselecting, by the terminal, the first network domain after the service is finished based at least in part on a judgment that the service is being performed.

5. The method according to claim 4, wherein the service is a PS domain service and/or a CS domain service.

6. The method according to claim 1, wherein the first network domain is a PS domain, and wherein the second network domain is a CS domain.

7. The method according to claim 1, wherein performing the location update comprises initiating, by the terminal, a CS domain location update request message, a PS domain location update request message, or a CS domain and PS domain combined location update request message.

8. The method according to claim 1, wherein determining that access to the first network domain has failed comprises receiving a CS response message from the first network domain.

9. The method according to claim 1, wherein determining that access to the first network domain has failed comprises receiving a PS response message from the first network domain.

10. A terminal device comprising:
    a first unit configured to obtain a locally-configured domain priority setting item when a terminal fails to access a first network domain, wherein the locally-configured domain priority setting item is pre-stored in the terminal and is configured to be set by an operator of the terminal; and
    a second unit configured to:
        reselect a network domain when the domain priority setting item obtained by the first unit indicates that the first network domain is preferential;
        judge whether registration in a second network domain is successful when the domain priority setting item obtained by the first unit indicates that the second network domain is preferential; and reselect a network domain when the registration in the second network domain is unsuccessful.

11. The terminal device according to claim 10, further comprising a third unit configured to judge whether a service is being performed before the second unit reselects the first network domain, wherein the third unit is configured to monitor performance of the service when the service is being performed, and wherein the third unit is configured to instruct the second unit to reselect the first network domain after the service is finished.

12. The terminal device according to claim 10, further comprising a fourth unit configured to perform a location registration or location update, wherein the location registration comprises initiating a CS domain location registration request message, a PS domain location registration request message, or a CS domain and PS domain combined location registration request message, and wherein the location update comprises initiating a CS domain location update request message, a PS domain location update request message, or a CS domain and PS domain combined location update request message.

13. The terminal device according to claim 10, wherein the first network domain is a CS domain, and wherein the second network domain is a PS domain.

14. The terminal device according to claim 10, wherein the first network domain is a PS domain, and wherein the second network domain is a CS domain.

\* \* \* \* \*